Aug. 26, 1930.  A. R. LAFFERTY ET AL  1,774,495
MACHINE AND METHOD FOR MAKING SPRINGS
Filed May 21, 1926  7 Sheets-Sheet 1

INVENTOR'S
ARTHUR R. LAFFERTY.
FRANK L. TURNER.
BY
Rector, Hibben, Davis, & Macauley
ATTORNEYS Aug. 26, 1930. A. R. LAFFERTY ET AL 1,774,495
MACHINE AND METHOD FOR MAKING SPRINGS
Filed May 21, 1926 7 Sheets-Sheet 2

INVENTOR'S
ARTHUR R. LAFFERTY.
FRANK L. TURNER.
BY
ATTORNEYS

Aug. 26, 1930.  A. R. LAFFERTY ET AL  1,774,495
MACHINE AND METHOD FOR MAKING SPRINGS
Filed May 21, 1926    7 Sheets-Sheet 4

INVENTOR'S
ARTHUR R. LAFFERTY,
FRANK L. TURNER,
BY
Rector, Hibben, Davis, & Macauley
ATTORNEYS Aug. 26, 1930.  A. R. LAFFERTY ET AL  1,774,495
MACHINE AND METHOD FOR MAKING SPRINGS
Filed May 21, 1926  7 Sheets-Sheet 6

INVENTOR'S
ARTHUR R. LAFFERTY
FRANK L. TURNER.
BY
Rector, Hibben, Davis, & Macauley
ATTORNEYS Aug. 26, 1930.  A. R. LAFFERTY ET AL  1,774,495
MACHINE AND METHOD FOR MAKING SPRINGS
Filed May 21, 1926   7 Sheets-Sheet 7

INVENTORS
ARTHUR R. LAFFERTY.
FRANK L. TURNER.
BY Rector, Hibben, Davis & Macauley
ATTORNEYS Patented Aug. 26, 1930

1,774,495

UNITED STATES PATENT OFFICE

ARTHUR R. LAFFERTY AND FRANK L. TURNER, OF DETROIT, MICHIGAN, ASSIGNORS TO BURROUGHS ADDING MACHINE COMPANY, OF DETROIT, MICHIGAN, A CORPORATION OF MICHIGAN

MACHINE AND METHOD FOR MAKING SPRINGS

Application filed May 21, 1926. Serial No. 110,642.

This invention relates to a machine and method for making springs.

It relates particularly to a machine for automatically forming coil springs from wire fed into the machine.

Closed coils springs heretofore made, that is, springs with the coils against one another, have a fixed tension or strength for a given size and character of wire and diameter of spring. It is desirable to be able to make, from a given size and character of wire, coil springs of like diameters but of different strengths. The present invention concerns an automatic machine that will accomplish this result.

It is also desirable to be able to form open springs or open springs with closed ends and novel mechanism is provided for achieving these results.

The general object of the invention is to provide an improved spring making machine.

A more particular object is to provide a spring making machine which will form closed springs of like diameter but of varying strength from the same size and character of wire.

Another object is to provide an improved means for automatically stopping the operation of the feeding mechanism when the springs are being cut off.

Another object is to provide an improved form of cutting means for severing the springs as they are formed together with a device for insuring that the springs will be cut off at the right place.

A further object is to provide an improved guide construction for guiding the wire from the feeding mechanism to the coiler.

Still another object is to provide an improved mechanism for forming open springs and an automatic mechanism for forming open springs with closed ends.

Other objects and advantages of the invention will appear from the specification and drawings.

An embodiment of the invention is illustrated in the drawings in which.

Figure 1:
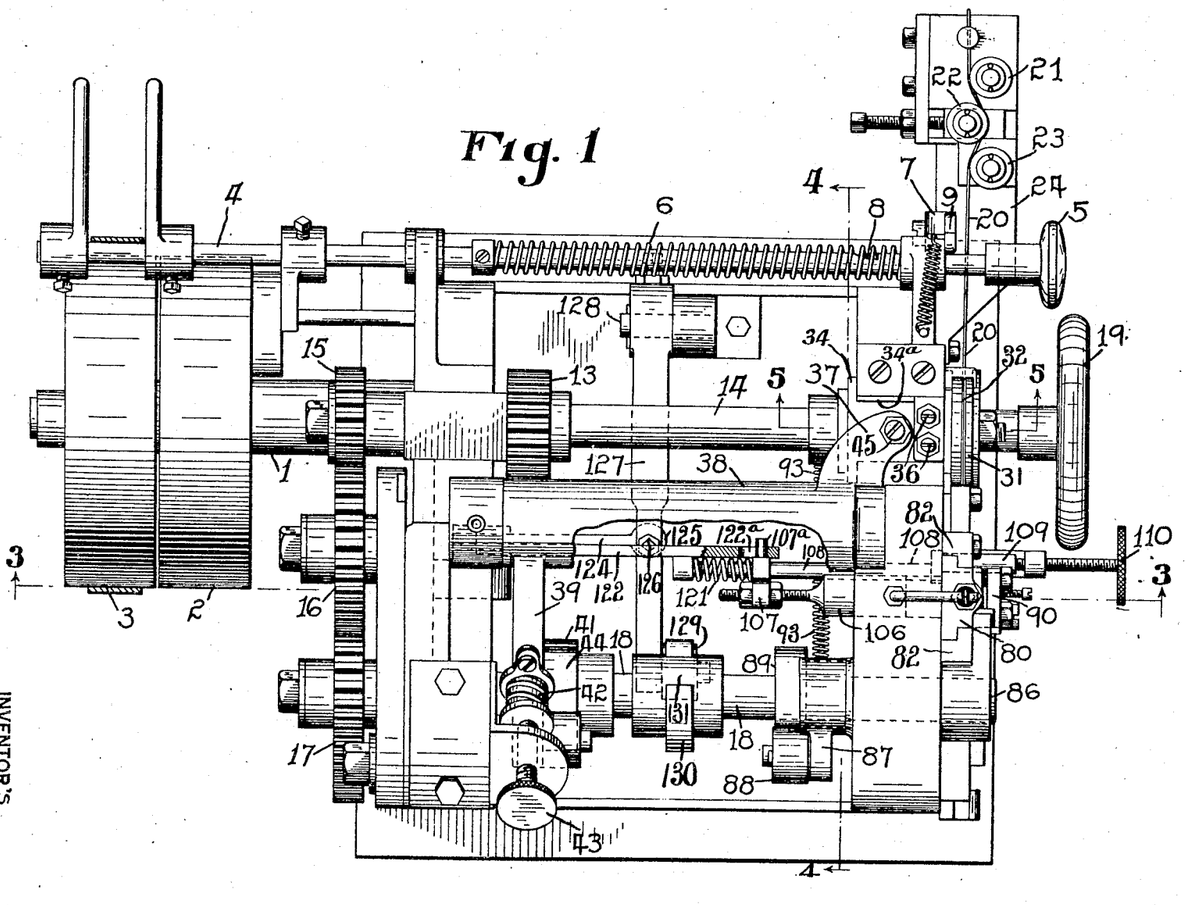
Figure 1 is a plan view of the machine with the protective coverings omitted to show the mechanism more clearly.

The machine has a main shaft 1 driven by an active pulley 2 with which is associated an idle pulley 3. A driving belt may be shifted from one pulley to the other by the belt shifter 4 operated by a knob 5 at the front of the machine and normally urged by spring 6 to the position illustrated in Figure 1. When the knob 5 is pulled forward, the belt is shifted from the idle pulley 3 to the active pulley 2 to start the machine. The shifter is held in position by a latch 7 which engages a notch 8 in the shifter rod and is provided with a handle 9 for releasing it.

The main shaft 1 carries a spur gear 10 (Fig. 3) meshing with a similar gear 11 on the shaft 12 and the gear 11 meshes in turn with a gear 13 on the shaft 14. The outer end of the shaft 14 carries another spur gear 15 shown in Fig. 1 that meshes with the gear 16 driving the gear 17 on the shaft 18 carrying certain controlling cams hereinafter described. It will be understood that the sizes of the gears may be changed to vary the speed of the shafts to vary the speed and action of the machine. A hand wheel 19 is connected to the front end of drive shaft 1 to turn the machine slightly by hand in making adjustments.

The wire 20 is guided into the machine over a series of straightening rolls, 21, 22 and 23, (Fig. 2) carried by an arm 24 of the machine frame, the middle roll 22 being adjustable to vary the tension on the wire as it moves to the feeding mechanism.

The feeding mechanism includes a lower feed roll 30 and an upper feed roll 31 having grooves 32 and 33 (Fig. 5) respectively of such size as to receive and grip the wire to forcibly feed it into the machine. The lower feed roll 30 is driven directly by the shaft 12 and the upper feed roll is connected directly to shaft 14 so that both of the rolls are driven positively but in opposite directions.

Figure 4:
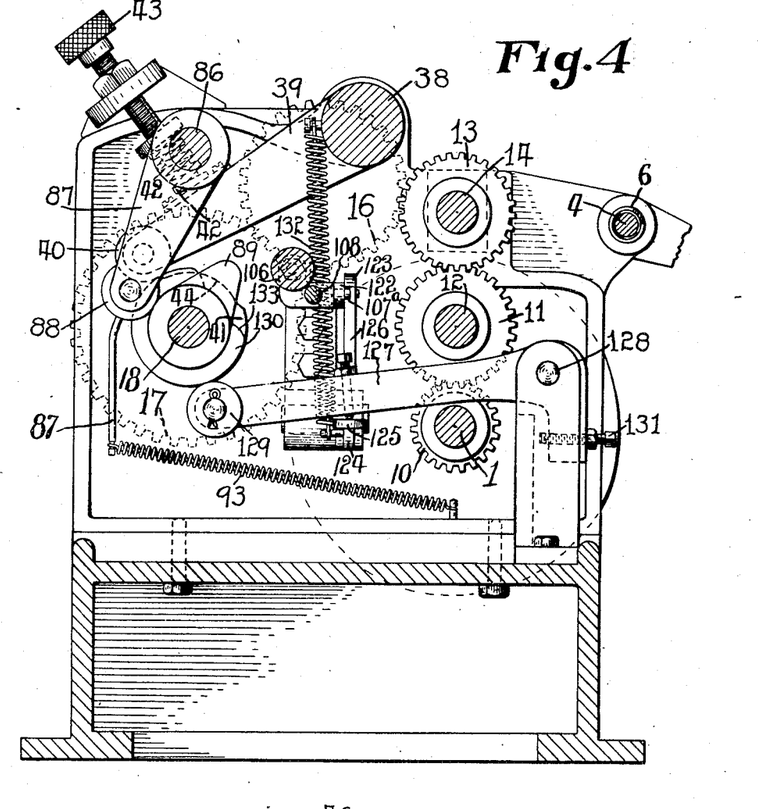
Fig. 4 is a section taken on the line 4—4 of Fig. 1, showing particularly the cams that govern the movement of certain of the mechanisms.
Figure 5:
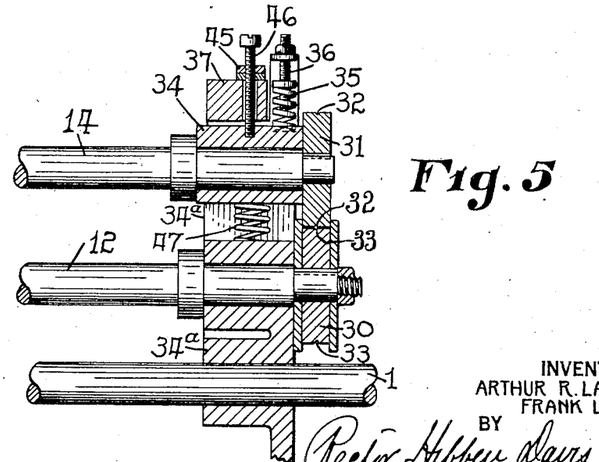
Fig. 5 is a section on the line 5—5 of Fig. 1, showing the feed roller.

It is necessary to momentarily cease feeding the wire into the machine at the instant the spring is being cut off. In order to effect this result, the bearing 34 of the upper feed roll shaft is made slideable in the frame portion 34ª of the machine frame as shown in Fig. 5. The bearing is held down by means of spring 35 bearing against an adjustable screw 36 to cause the feed rolls to frictionally engage and feed the wire to the forming die. The bearing of shaft 14 at the rear of the machine is constructed so that the shaft may have the limited movement required for such purpose. The bearing 33 is momentarily raised by means of an arm 37 (Figs. 1 and 5) extending from a shaft 38 on the opposite end of which is an arm 39 carrying a cam roller 40 (Fig. 4) engaging the face of a cam 41. The arm 39 is normally urged downward to cause the cam roller 40 to engage the face of cam 41 by means of spring 42 whose tension may be adjusted by an adjusting screw 43. The face of the cam 41 has a depressed concentric portion 44 (Fig. 4) onto which the cam roller is forced by the spring 42 as the cam rotates under the roller. The arm 37 engages lock-nuts 45 (Fig. 5) on the threaded bolt 46 which passes loosely through the arm and is threaded into bearing 34. When the concentric face 44 of the cam comes opposite the roller 40, the spring 42, which is strong enough to overcome the tension of spring 35, forces the roller to follow the contour of the cam and rock the shaft 38 counter-clockwise to raise the arm 37. This elevates the bearing 34 sufficiently to raise the upper feed roller and releases the grip of the rollers on the wire. Feeding of the wire is thus momentarily stopped until the face 44 of cam 41 passes the roller whereupon the bearing 34 is released after which it is forced downward again by the spring 35 to grip the wire. A spring 47 (Fig. 5) may be used to assist in lifting the bearing 33 against the tension of spring 35 but usually the spring 42 is made sufficiently strong to raise the bearing without any assistance from spring 47.

Figure 2:
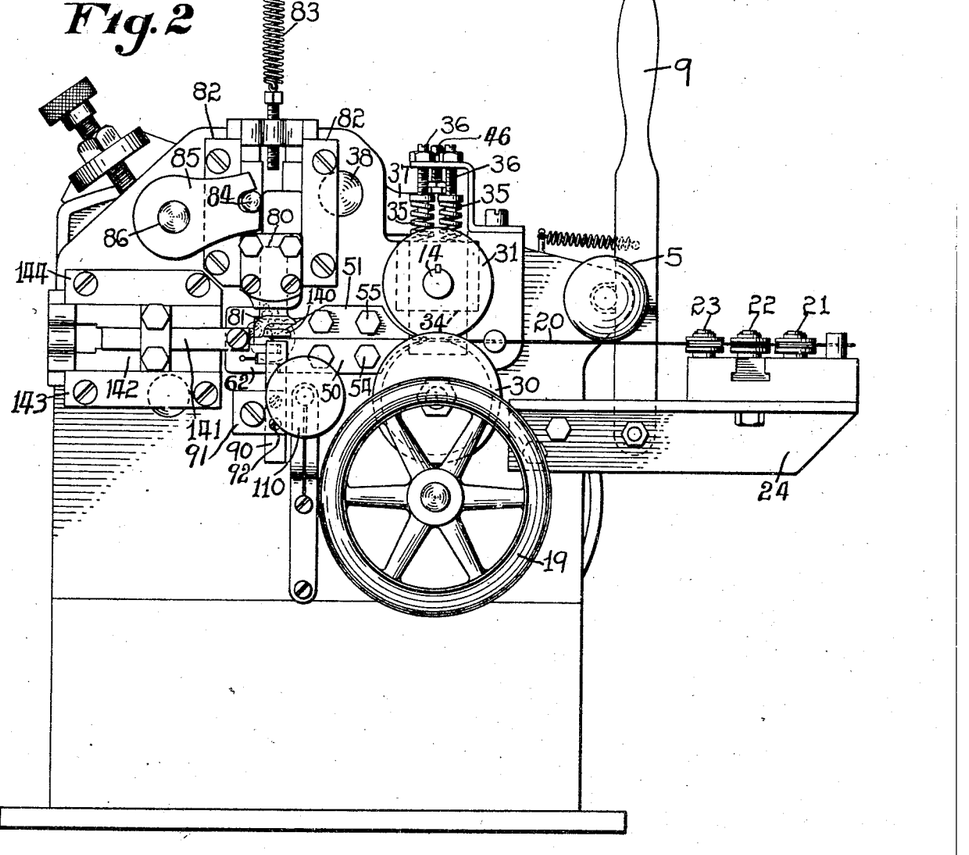
Fig. 2 is a front elevation.

The wire is guided into the machine between two guides 50 and 51 (Figs. 6 and 9) which extend from the feeding rolls to the spring forming mechanism. Instead of forming grooves in the faces of the guides, the contacting faces are offset as illustrated in Fig. 9, the depth of the offset being substantially equal to the diameter of the wire being fed into the machine. The offset shoulders are also spaced apart a distance substantially equal to the diameter of the wire with the result that, when the two guides are clamped together, a square opening is provided of a size equal to the wire diameter. Hardened steel portions 52 and 53 are inserted to form wearing surfaces at the points where the offsets are formed, as illustrated in Fig. 9. These may be replaced when worn out without having to replace the entire guide. The guides are bolted onto the machine by the bolts 54 and 55, as shown in Figs. 2 and 6.

The coiling mechanism includes a hardened steel block or die 60 having a series of curved openings 61, (Fig. 10) one of which is positioned opposite the point where the wire issues from the guides 50 and 51. The feeding mechanism forces the wire between the guides and into one of these curved openings which coils it into the form of a spring. Only one opening is used at a time but the block is provided with a plurality of openings so that, when one becomes too worn, the face of the block may be ground down to permit the next opening to be used. These openings not only coil the spring but they bend the wire to vary the tension of the spring as will be later described.

When one of the curved openings is aligned with the line of feed of the wire and a wire is forced through the opening, a closed coil spring of a given tension is produced. I have found, however, that I can increase the tension of the spring being wound by varying the angle of the curved groove to the line of feed of the wire and to accomplish this result I have provided the following construction.

Figure 6:
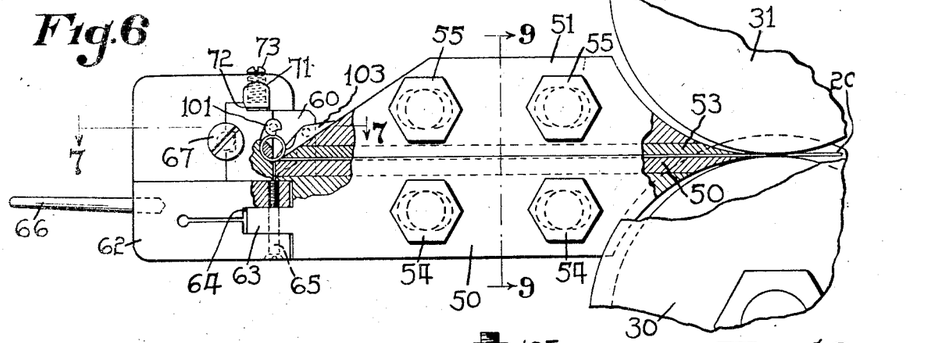
Fig. 6 is an end elevation partly broken away showing the feeding rollers, the guides for the wire, and the coiling mechanism.
Figures 7, 8, 9, 10:
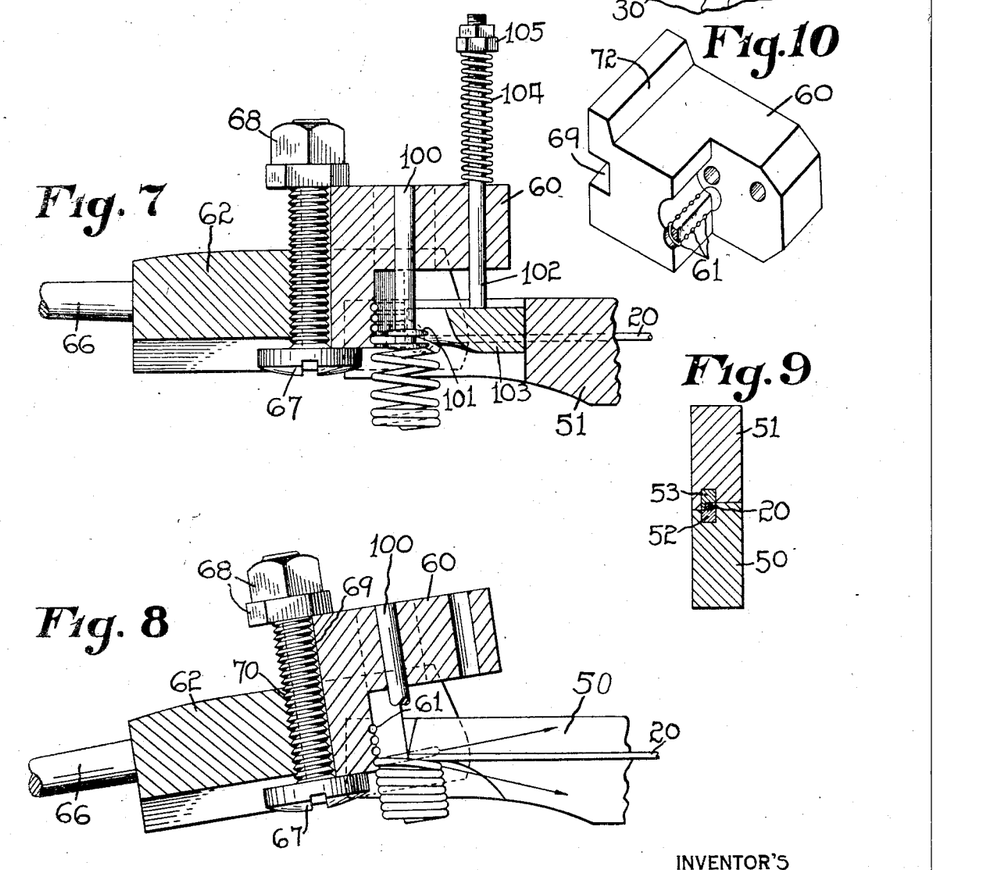
Fig. 7 is a detailed section on the line 7—7 of Fig. 6, showing the coiling mechanism in position for winding an open coil spring.
Fig. 8 is a detailed sectional plan view, showing the coiling mechanism in position to wind a closed coil spring.
Fig. 9 is a detailed section of the guides for guiding the wire from the feed roller to the coiling mechanism.
Fig. 10 is a perspective view of the coiling die.
Figure 11:
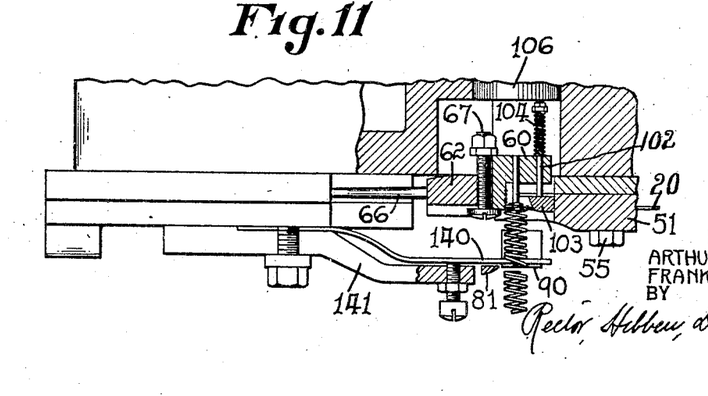
Fig. 11 is a plan view of the attachment associated with the cutting mechanism for insuring that the springs are cut off at the proper point.

The steel block 60 is mounted in a carrier 62 pivoted on the tongue 63 on the lower guide plate 50 (Fig. 6). The carrier has a bifurcated end 64 which straddles the tongue 63 and frictionally grips it. A pivot pin 65 extends loosely through the lower arm of the bifurcated end of the carrier and through the tongue 63 and is threaded into the upper arm of the bifurcated end of the carrier. By loosening the screw 65 the carrier may be swung on its pivot by means of handle 66 after which the screw 65 is tightened to hold carrier in position. The axis of the pivot of the carrier intersects the line of feed of the wire as shown in Figs. 7 and 8. The block 60 is slidably mounted in the carrier and adjusted to properly locate the curved opening being used relative to the pivotal axis by means of a bolt 67 and lock-nuts 68. The shank of the bolt extends through a slot 69 in the side of the block 60 and the carrier 62 has a threaded slot 70 for receiving the threads of the bolt. By turning the bolt 67, the threads travel in the carrier 62 and adjust the block 60 backward and forward. The block is held in adjusted position by means of a gib 71 having an inclined face 72 engaging an inclined face on the block 60. The gib is forced to position by a set-screw 73 which, when tightened, forces the block 60 into proper position in the carrier and holds it in such position until the set-screw is loosened for the purpose of adjusting the block to either slightly vary the position of its edge to make it coincide with the pivot point or to make a more extended adjustment due to the face of the block having been ground off for the purpose of using the next curved groove. When a wire is fed into the machine with the coiling die positioned at an angle to the line of feed, as best illustrated in Fig. 8, the wire is bent laterally at the same time that it is coiled into a spring. This lateral bend is utilized to form a spring with the coils urged toward one another when the spring is closed as well as when it is opened.

The action of the machine in forming the spring will be best understood by referring to Fig. 8. Assuming that the forming die is in line with the feeding groove, the end of the wire of the first coil would, as the coil is formed, normally come around on top of the wire being fed into the machine. When the forming die is angled, as shown in Fig. 8, the coil is bent laterally coincidently with its being formed and from the point where the coiling of the wire begins. As the first coil comes around, it normally tends to pass down on the inside side of the wire being fed into the machine as illustrated in dot and dash lines in Fig. 8, the spring coil thus tending to issue to the rear. It is not permitted to do this but, instead, the first coil is pulled forward so as to be on the outside of the entering wire or toward the front of the machine in which position it is guided and held by a guide 101 that will presently be described in detail. The spring coil thus actually issues toward the front of the machine, that is, in a direction opposite to that in which it normally tends to issue after the wire is coiled and bent. The springing of the wire toward the front does not put a permanent bend in it, but places each coil under a tension which urges it toward the coil being formed adjacent to it. It will be apparent that, by increasing the angle of the forming die, the coil being formed will tend to pass further to the rear of the entering wire and the tension under which the coil is placed by being forced to wind toward the front of the machine may be varied. Each of the coils of the finished spring tends to assume its normal position, but the manner in which the spring is wound prevents it from doing so. The tension under which the coils are placed must be overcome, however, when the spring is stretched in use and, since this tension may be varied as above described, it follows that the closed springs will have varying strength depending on the amount of the tension under which they are wound.

The spring, as formed, issues from the machine as one continuous coil which is cut into lengths by cutting mechanism as follows:

A cutter-head 80 (Fig. 2) carrying a knife 81 reciprocates in guides 82 and is normally held in elevated position by a spring 83. The head carries a stud 84 positioned in a slot in the arm 85 fixed to the rock shaft 86. This shaft carries an arm 87 having a cam roller 88 (Fig. 4) engaged by the nose of a cam 89 carried by the shaft 18. When the nose of the cam strikes the cam roller, it rocks the shaft in a clockwise direction viewed in Fig. 2, causing the cutter-head to descend and the knife to pass through the spring and past the edge of a lower cutting die 90 held in a projecting portion 91 of the machine frame by means of set-screws 92. It will be understood that the cam 89 which controls the cutting mechanism and the cam 41 which governs the release of the feeding mechanism are positioned relatively to one another so that the feeding mechanism is released at the time the cutting mechanism operates to sever the spring. The roller 88 is held against the cam 89 by the spring 93 connected to an extension of arm 87 as illustrated in Fig. 4.

It is also desirable to have a machine capable of making open springs or making open springs having closed ends of varying length. Mechanism has been provided for this purpose which will now be described.

The block 60 has an opening to receive a pin 100 (Fig. 7) having a slotted head 101 which is positioned to receive the coil of wire as it issues from the curved groove 61. The block 60 also has an opening to receive a slideable pin 102 carrying a curved guide 103 which engages the under part of the spring coil and bends it to open the spring as illustrated in Fig. 7. During this spring forming operation the curved groove 61 is in alignment with the line of feed of the wire. The guide 103 is normally urged to a retracted position by a spring 104 engaging the rear face of the block 60 and a stop 105 on the rear end of pin 102. The guide is prevented from moving rearwardly by the engagement of the end of pin 102 with a plunger 106 (Fig. 3) carried by a crosshead 107 to which is connected an adjusting rod 108 extending forward and having an offset portion 109 contacting an adjusting screw or stop 110. By adjusting the screw 110, the position of the plunger 106 may be changed to vary position of guide 103 to regulate the extent of the openings between the coils of the spring being formed.

Provision is also made to automatically form open springs having closed ends. The rod 108 which is connected to the cross head 107 extends through it and forms a support for a spring 121 (Figs. 3 and 12) which bears at one end against the cross head and at its other end against an offset portion or lug on a link 122 pivoted to the arm 123 of a bell crank lever whose other arm 124 has a lip 125 against which a bolt 126 strikes. The bolt 126 is carried by a cam arm 127 (Fig. 4) pivoted at 128 to the frame and having a cam roller 129 on its outer end. The cam roller engages the face of a cam 130 carried by the shaft 18. The extent of movement of the cam arm 127 may be regulated by the adjusting screw 131 carried by the arm and arranged to engage a portion of the machine frame, as shown in Fig. 4. The arm 124 of the bell crank lever is held upward in engagement with the bolt 126, which thus holds the cam roller 129 in engagement with the cam 130, by a spring 132, best shown in Figs. 3 and 4.

When the cam roller 129 is in engagement with the raised or concentric surface of the cam 130, the arm 124 is held in its lower position which thrusts the link 122 forward and through the medium of the spring 121 and associated parts the curved guide 103 is held in a forward position to form an open spring. When the roller 129 enters the notch 133 of the cam 130 the spring 132 pulls the arm 124 counterclockwise, thereby moving the link 122 to the rear and permitting the plunger 106 to be moved to the rear by spring 104 which simultaneously moves the curved guide 103 rearwardly, thereby permitting the spring that issues from the curved opening 61 to form as a closed spring for a predetermined distance, that is, until the roller 129 rides out of the notch in cam 130 and onto the raised or concentric portion which action again moves the plunger 106 and the curved guide 103 forward to cause an open spring to be formed. It will be understood that the length of the open and closed portions of the spring may be varied by varying the length of the depression or notch in the cam 130.

When it is not desired to use the automatic feature of forming an open spring with closed ends, the stop screw 110 is turned inwardly to force the plunger 106 to and hold it in such a position that it will not move the guide 103 to a position to form an open spring. In other words, the rod 109—108 together with the cross head 107 is blocked against movement toward the front of the machine. Provision is made for permitting movement of the link 122 under this adjustment by providing it with a slot 122$^a$ (Fig. 12) in which a pin 107$^a$ on the cross head 107 operates. This pin and slot connection permits the link 122 to reciprocate with the parts adjusted as above described. During such movement the spring 121 is tensioned but it cannot force the plunger 106 forward because this plunger is blocked by the stop screw 110. In order to save wear on the parts, the spring 132 may be disconnected from the arm 124 which allows the cam arm 127 to move to an inoperative position with relation to the cam 130. The automatic mechanism is thus not reciprocated while not in use.

The cutting mechanism which has been previously described is located sufficiently far from the spring forming die so as not to interfere with its angular adjustment. The point at which the wire is cut, or in other words the number of turns in the spring, is determined by varying the gear ration between the feed roll shaft 14 and the cam shaft 18. The length of the spring is, of course, determined by its pitch. When an open spring with closed ends is being formed, it is desirable to insure that the cutting means severs the spring in the middle of the closed portion so as to leave a closed end on the spring that is cut off of a length equal to the closed end remaining on the spring that is being formed. For this purpose there has been provided a spring arm 140 carried by bar 141 clamped in position on a slide 142 mounted between the guides 143 and 144 on the frame. The spring arm 140 is positioned between the coils of the spring a specified number of turns from the forming groove. The cutting knife 81 passes down beside and on the outside of this arm and in shearing relation with the cutting block 90 and severs the spring on the underside of the coil with one coil between the arm and the knife and severs the spring at the specified number of turns from the forming groove. The resiliency of the arm 140 permits it to move back and forth to adjust itself when the closed and opened portions of the spring are being formed in the coil and thereby prevents the spring from being distorted by the guide which it would be if the guide 140 were rigid.

The action of the arm 140 will be clear by visualizing the winding of an open spring with closed ends. During this operation there will be times when there are more closed coils between the forming die and arm 140 than at others. Obviously these closed coils do not occupy as much space longitudinally as do the open coils. There will be times, therefore, when, even though there always be the same number of turns between the die and arm 140, these turns will occupy more longitudinal space than others. The arm 140 is adjusted at the beginning of operations and, with this adjustment, there are a certain number of closed and a certain number of open coils between the die and arm 140. When, during winding operations, more closed coils are between the die and arm 140, the arm yields to prevent spreading the closed coils and then, as the proper proportion of closed and open turns come into place the arm moves back and positions the issuing coil in proper position to be severed. This action takes place quite rapidly and automatically. If the arm 140 were rigid the closed coils would be stretched and the springs distorted.

An open coil spring may also be formed without the use of the guide 103 for opening the coils as they are formed. This is accomplished by positioning the spring forming die block 60 at an angle to the line of feed opposite to the angle of its position for forming a closed spring with the coils urged toward one another. A construction for accomplishing this as well as of the operation heretofore described is illustrated in Figs. 13 to 18, inclusive.

Figure 13:
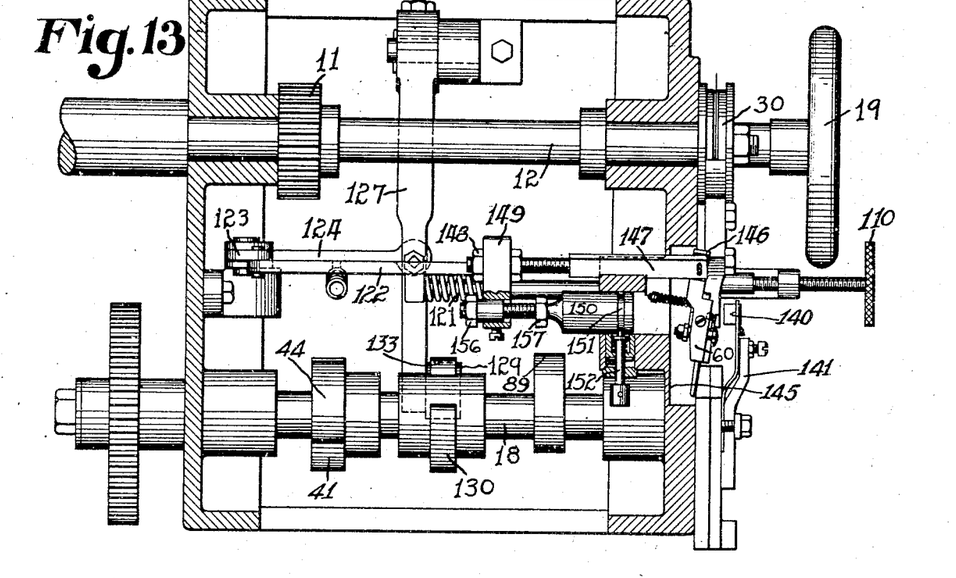
Fig. 13 is a sectional plan view on the line 13—13 of Fig. 4 showing a modified construction of some of the parts.
Figure 14:
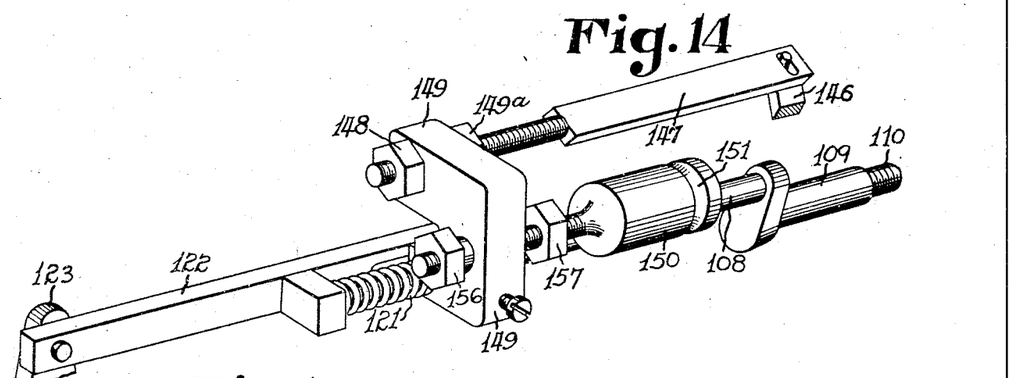
Fig. 14 is a perspective view showing a portion of the mechanism for controlling the die that coils the spring.
Figures 16, 17:
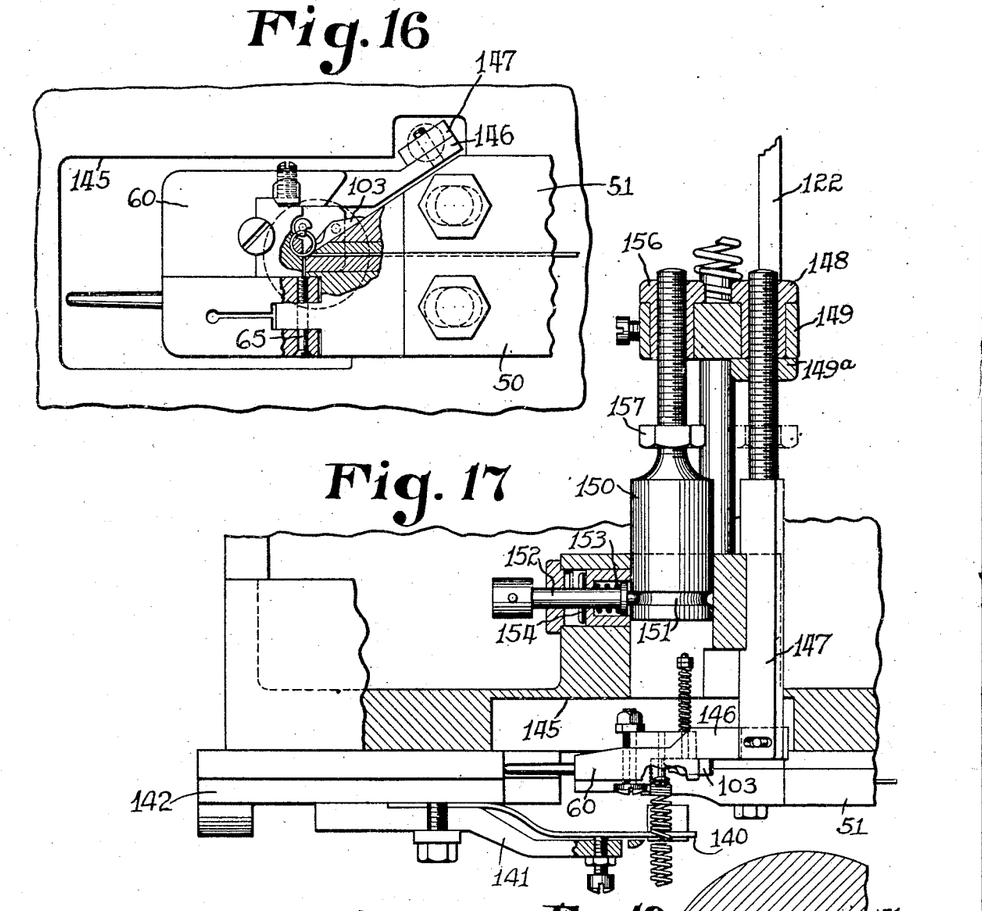
Fig. 16 is a fragmentary front view and section showing a modified construction of the winding block and its associated parts.
Fig. 17 is a sectional view through the controlling mechanism for the die block, showing it in position for winding an open coil spring or an open coil spring with closed ends.
Figures 18, 19:
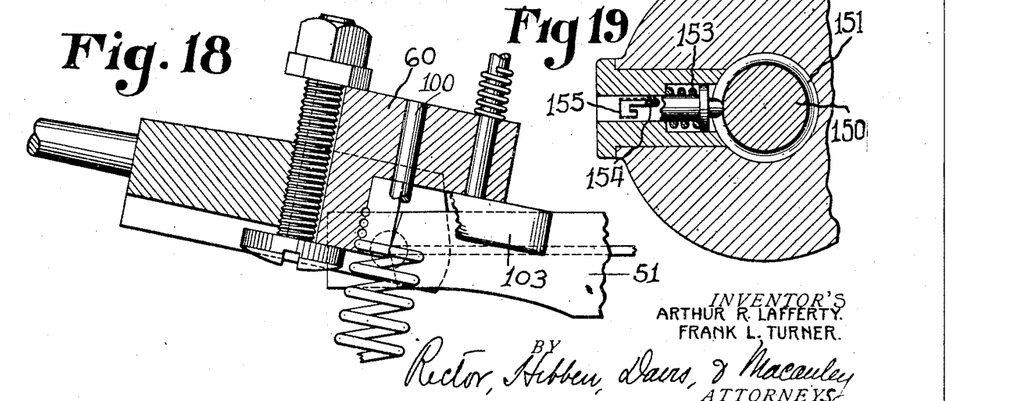
Fig. 18 is a diagrammatic sectional plan view through the die block showing it in position to wind an open spring.
Fig. 19 is a fragmentary section showing the locking means for holding a portion of the mechanism in inoperative position.

In this construction, the frame of the machine is cut away at 145 as shown in Figs. 13, 16 and 17 to permit the die 60 to be swung inwardly to the position illustrated in Fig. 13. The block 60 may be positioned at various angles by hand as has been previously described and the extent of its angularity to the line of feed will determine the spacing of the coils of the spring. One position is shown in Fig. 18 and it will be evident from the description heretofore given that, as the wire is fed into the forming die, it is not only curved but it is bent laterally, but instead of being bent so as to form a closed coil spring, it is bent in the reverse direction to form an open spring. In other words, the coiling of the wire and the spreading of the coils take place simultaneously. It is not necessary to perform a spreading operation after the forming of the spring as was the case in the forming of the open spring by the use of the spreading guide block 103 previously described.

Open coil springs with closed ends may also be automatically formed with the mechanism illustrated in Figs. 13 to 18, inclusive.

When this mechanism is used the clamping pivot 65 is loosened so as to permit the die block to swivel easily and the holder for the block is provided with an arm 146 connected by a pin and slot connection to a link 147 threaded into a sleeve nut 148 (Fig. 17) mounted in a cross-head 149 which is similar to the corresponding cross-head 107 heretofore described. The link is held in adjusted position by the lock nut 149$^a$. The cross-head is reciprocated by the link 122 controlled by the cam 130 as heretofore described. When the link 122 is thrust forward by the high portion of the cam engaging the cam roller 129, the die block 60 is swung to the position shown in Fig. 13 to form an open spring and when the link 122 is pulled to the rear the die block is brought back in alignment with the line of feed to form an ordinary closed spring. It will be understood that by changing the shape of the cam 130 the movement of the link 122 can be varied to vary the length of the open and closed portions of the spring and that by increasing the throw of the link 122 the spring forming die block can be moved past the line of feed to make the closed portion of the spring a portion in which the coils are urged toward one another.

When it is desired to form an open spring, as heretofore described, the means for automatically oscillating the die block 60 must be rendered inactive, and this may be done by backing the lock nut 149$^a$ away from the cross-head 149 to the dotted line position shown in Fig. 17. When this has been done the cross-head slides idly on the sleeve 148 and has no effect in moving the die block which may then be set by hand in any desired position and clamped in such position by tightening the pivot pin 65.

Figures 3, 12:
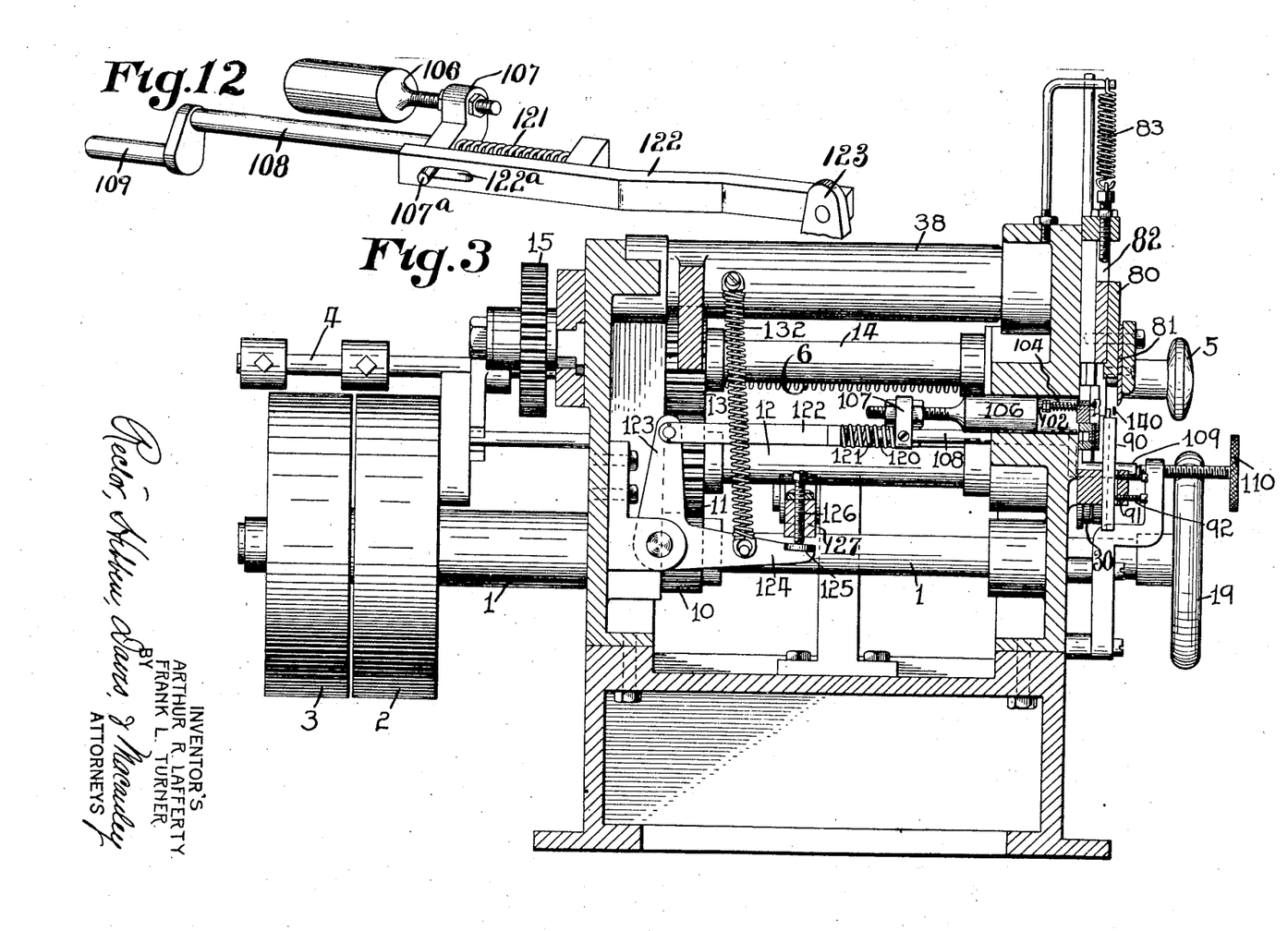
Fig. 3 is a section taken on the line 3—3 of Fig. 1.
Fig. 12 is a detail perspective view of the link connection for making open springs.
Figure 15:
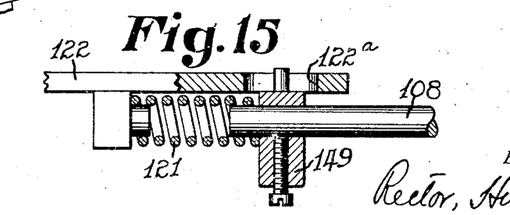
Fig. 15 is a fragmentary sectional detail through the operating link shown in Fig. 14.

When the mechanism above described for forming an open spring or an open spring with closed ends is used, it is also desirable to render inoperative the means for controlling the guiding block 103. For this purpose the plunger 150 which corresponds to the plunger 106 heretofore described is provided with a groove 151 into which a locking plunger 152 is normally urged by a spring 153. This plunger may be held in non-locking position by pulling it outwardly against the tension of a spring and seating the cross pin 154 in the short portion of the bayonet slot 155 shown in Fig. 19. The plunger 150 is connected to the cross-head 149 by being threaded into a sleeved nut 156 locked in position by a nut 157. When the nut 157 abuts the cross-head the plunger moves with the latter, but when the nut is backed away to the position illustrated in Figs. 13 and 17 the cross-head slides idly on the sleeve. With this construction, when it is desired to render the guide block 103 ineffective the locking pin 152 is released and the adjusting screw 110 abuts the rods 109—108 connected to the cross-head 149, the same as shown in Fig. 12, is turned to move the plunger 150 inwardly until the groove 151 is in a position to receive the pin which thereupon enters the groove and holds the plunger in retracted position. The nut 157 is then backed away from the cross-head 149 to permit the latter to move freely relative to the plunger. The adjusting screw 110 is then backed away from the rod 109 in order that this rod may move outwardly with the cross-head when the cross-head is moved in that direction, the rod 108 being connected to the cross-head by a set screw as shown in Fig. 15. The nut 149ª is then tightened against the cross-head so that the link 147 will move to oscillate the die block. Movement of link 122 is transmitted in one direction to the cross-head 149 through a spring 121 as previously described. The retracting movement is transmitted by the engagement of the outer end of the slot 122ª, Fig. 15, with a pin on the cross-head 149. The position of this pin in the slot may be varied by means of the adjusting screw 110 operating through rods 109, 108. For example, in Fig. 15 the pin is shown in about the middle of the slot, that is, the rod 108, 109 is abutting the adjusting screw 110 thereby holding the cross-head against further forward movement but permitting the link 122 to complete its forward throw against the tension of spring 121. Accordingly, by adjusting the screw 110, the forward movement of the cross-head 149 may be limited in varying amounts to thereby vary the extent of oscillation of the die block 60 to vary the spacing between the coils of the spring.

It will be understood that the construction shown in Figs. 13 to 19, inclusive, may also be used like that described and shown in the preceding figures—that is, it may be used to form a spring with closed coils of increased tension or the guide 103 may be used to form open coil springs or by adjusting the mechanism to use the plunger 150, the mechanism may be used to form open coil springs with closed ends.

It is to be understood that the construction shown is for purposes of illustration only and that variations may be made in it without departing from the spirit and scope of the invention as defined by the claims.

We claim:

1. The method of forming a closed coil spring with the coils normally urged toward one another with substantial tension when the spring is closed which consists in bending a wire into a circle to form a coil, simultaneously bending the wire laterally to cause the spring to issue as a coil in one direction, and forcing the wire to issue as a coil in the opposite direction.

2. The combination in a spring-making machine of a wire feeding mechanism, means for receiving the wire from said feeding mechanism and coiling it into a closed coil spring with the tension of the wire urging the coils toward one another with a substantial tension when the spring is closed, and means for severing the wire after the spring is formed into predetermined lengths.

3. The combination in a spring-making machine of a wire feeding mechanism, means for receiving a wire from the feeding mechanism in line with the line of feed in said mechanism and for coiling it into a closed coil spring with the tension of the wire urging the coils toward one another, with a substantial tension when the spring is closed, and means for severing the spring coil into predetermined lengths.

4. A spring-making machine having a wire feeding mechanism, means for receiving the wire from the feeding mechanism acting to coil and bend the wire to form a spring tending to wind in one direction, said coiling and bending means being positioned relative to the wire being fed into the machine so that the first coil of said spring can be sprung to the side of said feeding-in wire opposite to that on which said coil normally tends to go, and means acting to automatically sever the coil into predetermined lengths.

5. The combination in a spring-making machine of a wire feeding mechanism, means for receiving the wire from the feeding mechanism in line with the line of feed in said mechanism and for coiling the wire to form a spring tending to wind in one direction relative to the wire entering the machine, said means acting to cause the spring to be wound in the opposite direction when the first coil is started on the side of the entering wire opposite to that to which it normally tends to go and means for automatically severing the coil into predetermined lengths at a point removed from the initial coil formed by said coiling means.

6. The combination in a spring-making machine of a wire feeding mechanism, means for receiving the wire from the feeding mechanism and for coiling and bending the wire to form a spring tending to issue as a coil in one direction relative to the wire entering the machine, said means acting to cause said spring to issue as a coil in the opposite direction where the first coil is sprung to the opposite side of the wire entering the machine, and means for severing the coil into predetermined lengths.

7. A spring-making machine having a wire feeding mechanism, a spring-forming device into which wire is forced by said feeding mechanism, said spring-forming device acting to coil the wire into a closed coil spring tending to issue as a coil in one direction, means for causing the wire to issue as a coil in the opposite direction, and means for severing the coil in predetermined lengths.

8. A spring making machine having a wire feeding mechanism, a die into which wire is forced by said feeding mechanism, said die having a curved opening positioned at an angle to the line of feed of said wire to cause the wire to be coiled into a closed coil spring tending to issue as a coil in one direction, a guiding means for forcing said wire to issue as a coil in the opposite direction, and means for severing said coil into predetermined lengths.

9. The combination in a spring-making machine of a wire feeding mechanism, a die block having a curved opening for receiving a wire and bending it into a coil, said die block being angularly adjustable relative to the line of feed of the wire in one direction to bend the wire laterally to form an open spring winding in one direction and also angularly adjustable in the opposite direction to form a spring tending to wind in the opposite direction, and means for causing said second spring to wind in the same direction as the first to form a closed coil spring with the tension of the coils urging them toward one another.

10. The combination in a spring-making machine of a wire feeding mechanism, means for receiving the wire from said feeding mechanism and for bending it laterally at the same time it is being bent into a coil, said bending and coiling means being angularly adjustable relative to the line of feed of the wire to vary the amount of lateral bend given to the spring, and means for automatically severing the spring coil into predetermined lengths.

11. The combination in a spring making machine of a wire feeding mechanism, means for receiving the wire from said feeding mechanism and coiling it into a spring and simultaneously bending it laterally from substantially the point where the coil leaves the feeding mechanism, said means being adjustable to vary the amount of lateral bend, and means for cutting the coil into predetermined lengths.

12. The combination in a spring making machine of a wire feeding mechanism, a single means for receiving the wire from the feeding mechanism in line with the line of feed and coiling it into a spring and simultaneously bending the wire laterally to vary the spacing of the coils relative to one another, and means for severing the spring coil into predetermined lengths.

13. The combination in a spring making machine of a wire feeding mechanism, a single means for receiving the wire from the feeding mechanism and coiling it into a spring and simultaneously bending it laterally to space the coils relative to one another, automatic means for oscillating the spring forming means to vary the spacing of the coils relative to one another, and means for severing the spring coil.

14. The combination in a spring making machine of a wire feeding mechanism, a spring forming die having a wire-receiving opening positioned at an angle to the line of feed to simultaneously bend the wire into a coil and bend it laterally to space the coils relative to one another, means for automatically oscillating the die relative to the line of feed to vary the spacing of the spring coils, and means for severing the wire.

15. The combination in a spring making machine of a wire feeding mechanism, a die block having a curved opening for receiving a wire to bend it into a coil, means for automatically oscillating the die block to vary the position of the curved opening relative to the line of feed to vary the spacing between the coils, and automatic means for severing the spring coil.

16. The combination in a spring making machine of a wire feeding mechanism, a forming die for coiling the wire into a spring and simultaneously bending it laterally, automatic means for oscillating the die angularly relative to the line of feed of the wire, and means for severing the spring coil.

17. The combination in a spring making machine of a wire feeding mechanism, a die having a curved opening into which the wire is fed by said mechanism, and an adjustable holder for said die by means of which it may be swung laterally to position the opening extending through it at an angle to the line of feed of the wire to vary the strength of the spring being formed.

18. The combination in a spring making machine of a wire feeding mechanism including guides for guiding the wire, a die having a curved groove into which the wire is fed by said mechanism, and a holder pivoted to one of the guides and carrying said die, said holder being adjustable to position the die at an angle to the line of feed of the wire.

19. The combination in a spring making machine of a wire feeding mechanism, a spring coiling device, a grooved member for receiving the coil of said spring as it issues from the coil forming device, and a spreading means cooperating with said grooved member to spread the spring coils a predetermined amount to form an open spring.

20. The combination in a spring making machine of a wire feeding mechanism, a spring coiling device, a grooved member for receiving the coil of the spring as it issues from the coiling device, a spreading means cooperating with said grooved member to spread the coils to open the spring, and means for automatically moving said spreading device into and out of operating position to form springs having opened and closed portions.

21. The combination in a spring forming machine of a wire feeding mechanism, means for coiling the wire into a closed spring, automatic means for spreading a predetermined number of coils to form an open spring with closed ends, and means for adjusting said automatic means to vary the degree of opening between the coils, said adjusting means being movable to a position to prevent said automatic means from being effective to open the spring, said automatic means having yielding portions permitting it to move while being so held.

22. The combination in a spring forming machine of a wire feeding mechanism, means for coiling the wire into a closed spring, a guide for spreading the coils of the spring, automatic means having a yielding connection with said guide to move it into and out of operating position, and adjusting means for limiting the movement of said guide toward operating position and for preventing it from moving to operating position.

23. The combination in a spring making machine of a wire feeding mechanism, a spring coiling device, a cutting means, and an adjustable resilient arm engaging the spring near the cutting device at a predetermined number of turns from the spring coiling device to thereby insure that the spring will be cut by the cutting means at a predetermined point.

24. The combination in a spring making machine of a wire feeding mechanism, a spring coiling device, a spring cutting means, a resilient arm over which the turns of the springs are progressively wound as they come from the coiling device, and an adjustable stop for positioning said arm in relation to the cutting means.

25. The combination in a spring making machine of a wire feeding mechanism including two continually rotating feeding rolls, a movable bearing for one of said rolls, means for urging said bearing in a direction to cause the feed rolls to engage a wire between them, and means for momentarily raising said bearing to move one of said rolls out of feeding engagement with the wire.

26. The combination in a spring making machine of a pair of continually rotating feeding rolls, a movable bearing for one of said rolls, means for normally urging said bearing in the direction to cause its feeding roll to engage a wire between the rolls, a cutting device for cutting into given lengths the spring formed from said wire, and means for automatically raising said movable bearing to move its feeding roll out of feeding engagement with the wire at substantially the same time that the cutting mechanism operates to cut the spring.

27. The combination in a spring making machine of a lower feed roll, an upper feed roll, a movable bearing for said upper feed roll, a spring normally urging said bearing in a direction to cause the upper feed roll to engage a wire between itself and the lower feed roll, a spring-pressed member for raising said bearing to disengage the upper feeding roll from the wire, and a cam cooperating with said member for preventing it from raising the bearing except when the cam is in predetermined positions.

28. The combination in a spring making machine of a pair of feeding guides having abutting faces, each of said faces being offset and the shoulders of said offset portions being spaced from one another when the guides are positioned together to thereby form an adjustable groove for guiding the wire being fed.

ARTHUR R. LAFFERTY.
FRANK L. TURNER.